(12) United States Patent　　(10) Patent No.: US 12,584,658 B2

Eickhoff　　(45) Date of Patent: Mar. 24, 2026

(54) PARABOLIC TROUGH COLLECTOR MODULE, PARABOLIC TROUGH COLLECTOR MODULE UNIT, AND SOLAR THERMAL POWER PLANT

(71) Applicant: DEUTSCHES ZENTRUM FÜR LUFT-UND RAUMFAHRT E.V., Cologne (DE)

(72) Inventor: Martin Eickhoff, Gador (ES)

(73) Assignee: DEUTSCHES ZENTRUM FÜR LUFF—UND RAUMFAHRT E.V., Cologne (DE)

( * ) Notice: Subject to any disclaimer, the term of this patent is extended or adjusted under 35 U.S.C. 154(b) by 1056 days.

(21) Appl. No.: 17/632,148

(22) PCT Filed: Aug. 3, 2020

(86) PCT No.: PCT/EP2020/071819
§ 371 (c)(1),
(2) Date: Feb. 1, 2022

(87) PCT Pub. No.: WO2021/028251
PCT Pub. Date: Feb. 18, 2021

(65) Prior Publication Data
US 2022/0275971 A1　　Sep. 1, 2022

(30) Foreign Application Priority Data

Aug. 13, 2019　(DE) ..................... 20 2019 104 454.3

(51) Int. Cl.
*F24S 23/74*　　(2018.01)
*F24S 30/00*　　(2018.01)
(Continued)

(52) U.S. Cl.
CPC ............. *F24S 23/74* (2018.05); *F24S 30/425* (2018.05); *F24S 40/80* (2018.05); *F24S 2030/15* (2018.05)

(58) Field of Classification Search
CPC ......... F24S 25/12; F24S 23/74; F24S 2030/15
See application file for complete search history.

(56) References Cited

U.S. PATENT DOCUMENTS 1,162,505 A　*　11/1915　Nichols ................. F24S 30/428
126/696
3,847,136 A　　11/1974　Salvail
(Continued)

FOREIGN PATENT DOCUMENTS

DE　　202015000425 U1　　4/2016
DE　　202015001498 U1　　4/2016

OTHER PUBLICATIONS

International Search Report issued on Sep. 22, 2020, in corresponding International Application No. PCT/EP2020/071819; 5 pages (with English Translation).
(Continued)

*Primary Examiner* — Jorge A Pereiro
(74) *Attorney, Agent, or Firm* — Maier & Maier, PLLC

(57)　　ABSTRACT

A parabolic trough collector module with an absorber tube with a central axis; a parabolic reflector which focuses solar radiation onto the absorber tube and which includes a reflector surface; and a stand device, on which the parabolic reflector is pivotally mounted, the stand device having at least one stand post and the absorber tube being mounted on the stand post. In the reflector surface, the parabolic reflector has a cut-out section running perpendicularly to the longitudinal direction, and a support device extends through the cut-out section and has an absorber tube mount that forms a
(Continued)

linear guide, on which mount the absorber tube is slidingly mounted in the longitudinal direction.

10 Claims, 3 Drawing Sheets

(51) Int. Cl.
    *F24S 30/425*     (2018.01)
    *F24S 40/80*     (2018.01)

(56) References Cited

U.S. PATENT DOCUMENTS

| | | | | |
|---|---|---|---|---|
| 5,058,565 A * | 10/1991 | Gee | F24S 23/74 | |
| | | | 359/872 | |
| 2010/0050560 A1 * | 3/2010 | Werner | F16M 11/18 | |
| | | | 52/693 | |
| 2010/0229851 A1 * | 9/2010 | Reynolds | F24S 30/425 | |
| | | | 126/605 | |

| | | | | |
|---|---|---|---|---|
| 2011/0000479 A1 * | 1/2011 | Gonzalez Moreno | | |
| | | | F24S 25/617 | |
| | | | 126/694 | |
| 2011/0186041 A1 * | 8/2011 | Kalina | F24S 30/425 | |
| | | | 126/714 | |
| 2011/0291405 A1 * | 12/2011 | Burger | F24S 80/30 | |
| | | | 285/114 | |
| 2012/0186579 A1 | 7/2012 | Dopp et al. | | |
| 2013/0092154 A1 * | 4/2013 | Lu | F24S 30/425 | |
| | | | 126/685 | |
| 2014/0261632 A1 * | 9/2014 | Clavelle | H02S 20/32 | |
| | | | 136/246 | |
| 2014/0270740 A1 * | 9/2014 | O'Rourke | F24S 40/70 | |
| | | | 126/611 | |
| 2018/0023845 A1 * | 1/2018 | Eickhoff | F24S 23/71 | |
| | | | 126/600 | |

OTHER PUBLICATIONS

Office Action issued on Mar. 4, 2023, in related to European Patent Application No. 2075066305-1002, 12 pages.

* cited by examiner

PARABOLIC TROUGH COLLECTOR MODULE, PARABOLIC TROUGH COLLECTOR MODULE UNIT, AND SOLAR THERMAL POWER PLANT

FIELD

The present invention relates to a parabolic trough collector module comprising an absorber tube, a parabolic trough reflector focusing solar radiation into the absorber tube and having a reflector surface, and comprising at least one stand device to which the parabolic reflector is pivotally mounted. The invention further relates to a parabolic trough collector module unit comprising a plurality of parabolic trough collector modules as well as to a solar thermal power plant comprising a plurality of parabolic trough collector module units.

BACKGROUND

Solar thermal power plants use the energy of sunlight to heat a heat transfer medium, the heat often being used to generate electricity. Optical concentrators are used to focus solar radiation onto an absorber in which the heat transfer medium circulates. The optical concentrators are the largest investment item of solar thermal power plants and have a significant influence on their efficiency.

Known solar thermal power plants comprise parabolic trough collectors. A parabolic trough collector has an elongated collector structure with a parabolic cross section. Typical aperture openings are 5-7 m. Individual parabolic trough collector modules, which are also referred to as "solar collector elements" (SCE) have a length of about 12 m. A plurality of such modules is assembled into parabolic trough collector units which are generally oriented in a north-south direction. The modules of a unit are usually pivoted together to track the parabolic reflectors according to the position of the sun. The axis of gravity of known modules, and thus the axis of rotation of the modules, is located near the apex of the parabola and, as such, remote from the absorber tube. Therefore, the absorber tube is usually moved along during pivoting. To enable this, the absorber tubes are connected directly to the parabolic reflector or the support structure of the parabolic reflector by means of special absorber tube mounts. Therefore, flexible absorber tube connections are necessary between two independently movable parabolic trough collector units, which are provided using so-called ball joint connecting lines or swivel joint connecting lines. Such connecting lines are constructively complex and rather cost and maintenance intensive. In addition, the flexible absorber tube connections result in a pressure drop and in heat losses. Further, the support structure of the parabolic reflector must be designed to be load nearing and stable, so as to absorb the high weight forces of the absorber tube. Since the parabolic reflectors are the largest investment item, the stable structure of these parabolic reflectors significantly increases the investment costs.

Further, the absorber tubes expand due to the heat as they are heated by solar radiation. Therefore, the absorber tube mounts have to compensate for the axial elongation of the absorber tubes. Thus, it is provided that the absorber tube mounts are usually tiltably connected with the parabolic reflector by means of a hinge or a spring plate. Tilting the absorber tube mount changes the distance between the parabolic reflector and the absorber tube, so that the absorber tube can move out of the focus of the parabolic reflector when the absorber tube mounts are strongly tilted. The maximum length of parabolic trough collector units is limited thereby. In addition, rotary length compensation devices have to be provided at each end of a collector unit to compensate for the axial elongation and the rotation of the absorber tube. These lead to increased investment and maintenance costs, and, in addition, these lead to pressure losses and heat losses during operation.

Moreover, so-called fixed focus collectors are known, in which the parabolic reflector is pivoted about the absorber tube. In such collectors, the absorber tube is not pivoted along, so that the cost-intensive absorber tube mounts between two parabolic trough collector units can be omitted. However, the absorber tubes are still connected directly with the parabolic reflector or the parabolic reflector support structure via absorber tube mounts, with the problems of the absorber tube still persisting, however.

Fixed focus collectors are known from DE 20 2015 000 425 U1 and DE 20 2015 001 498 U1 of the applicant, in which the absorber tube is mounted on a stand device via a linear guide. For this purpose DE 20 2015 000 425 U1 provides a slide rail tensioned at the stand device via tensioning means. It has been found, however, that tensioning the slide rail is very complex and that stability problems may occur.

SUMMARY

Therefore, it is an object of the present invention to provide a parabolic trough collector module of the type mentioned above, in which the absorber tube is mounted in a constructively simple manner. Further, it as an object of the present invention to provide a parabolic trough collector unit having such a module, as well as a solar thermal power plant having such a parabolic trough collector module unit.

The parabolic trough collector module of the invention comprises an absorber tube having a central axis, a parabolic reflector focusing solar radiation onto the absorber tube and having a reflector surface, and a stand device. The parabolic reflector is pivotally mounted on the stand device. The stand device comprises at least one stand post, the absorber tube being supported on the stand post. The invention is characterized in that the parabolic reflector has a recess in the reflector surface, which extends transversely to the longitudinal direction, with a support device extending through the recess and comprising a absorber tube mount forming a linear guide on which the absorber tube is mounted for displacement in a longitudinal direction.

In the parabolic trough collector module of the invention, the absorber tube can thus be advantageously supported by the support device, while the linear guide allows the absorber tube to expand without restriction when heated. Due to the linear guide, the absorber tube can move relative to the support device corresponding to the elongation. Further, a part of the weight of the absorber tube can be supported by the support device, so that complex structures in the area of the stand device for supporting the weight of the absorber tube can be omitted.

The support device may in particular support the absorber tube on the ground.

Because the support device extends through the recess in the parabolic reflector, the absorber tube can be supported independently of the parabolic reflector and the stand device. Within the framework of this invention, the longitudinal direction of the absorber tube is understood to be the direction of the central axis A of the absorber tube.

It may be provided in particular that the parabolic reflector is mounted on the stand device to be pivotable around an axis of rotation, the axis of rotation D corresponding to the central axis A of the absorber pipe.

Preferably, it is provided that a linear bearing forming a linear guide is arranged on the at least one stand post, via which the absorber tube is mounted for displacement in a longitudinal direction. Therefore, besides being mounted on the absorber tube mount of the support device, the absorber tube is also mounted on the stand post via a linear bearing. Thereby, the weight force of the absorber tube to be borne is distributed to the support device and the at least one stand post.

The parabolic reflector may be mounted on the pivotable stand device in particular by means of a radial bearing, the radial bearing being arranged around the absorber tube or around the absorber tube and the linear bearing. Using such a radial bearing, it is possible to provide a bearing for the parabolic reflector in a constructively simple manner, in which the axis of rotation extends on the central axis of the absorber tube, so that the parabolic reflector is pivoted around the absorber tube. Here, the absorber tube or the absorber tube and the linear bearing are passed through the radial bearing in an advantageous manner.

In the parabolic trough collector module, a support structure with two supporting struts may be provided that are arranged transversely to the central axis of the absorber tube and via which the parabolic reflector is supported on the stand device. Such a structure has proven to be particularly advantageous and offers a constructively simple mounting of the parabolic reflector on the stand device. Here, it is preferably provided that the supporting struts are each arranged at an end face of the parabolic reflector.

Preferably, it is provided that the support structure has two torsion-resistant support elements extending parallel to the longitudinal sides of the parabolic reflector. By means of the support elements it is possible to design the stability of the parabolic reflector in an advantageous manner such that only a slight twisting of the parabolic reflector can occur. Preferably, it is provided that a respective support element is arranged at one of the longitudinal edges extending along the longitudinal sides of the parabolic reflector. Together with the supporting struts, the torsion-resistant support elements can thus provide a frame for the parabolic reflector, so that a very stable structure can be realized. For this purpose, the support elements may be connected with the supporting struts.

The arrangement of the support elements at the side edges further offers sufficient space for the recess extending transversely to the longitudinal direction, so that it is prevented that the support device collides with the support elements during the pivoting movement of the parabolic reflector.

The supporting struts and/or the torsion-resistant support elements may be arranged at least partly above a horizontal plane extending through the central axis of the absorber tube. Thereby, it is possible to create a "counter weight" to the sections of the parabolic reflector located below this horizontal plane. It may be provided in particular that the axis of gravity of the parabolic reflector corresponds to the axis of rotation D of the parabolic reflector. In this manner, the parabolic reflector can be pivoted in a particularly advantageous manner, while it is possible to balance the weight of the entire parabolic trough collector module and no torsional load is generated by imbalance.

The parabolic reflector may be mounted on the at least one stand post via the radial bearing, the radial bearing comprising a radial bearing element, and the supporting struts extending above the radial bearing element and being connected with the radial bearing element. Such a structure has proven to be particularly advantageous, in particular also with respect to the arrangement of the axis of gravity.

In a preferred embodiment of the invention it is provided that the absorber tube mount comprises a linear bearing rail extending in the axial direction of the absorber tube. Such a linear bearing rail advantageously provides a linear bearing for the absorber tube. Here, it may be provided that a running gear connected with the absorber tube is guided on the linear support rail.

Preferably, it is provided that the linear bearing rail is arranged on the upper side of the absorber tube. In other words: in a basic position of the parabolic reflector, in which the side edges of the parabolic reflector are located in a horizontal plane, the linear bearing rail is arranged on the side of the absorber tube averted from the parabolic reflector. This side is the side of the absorber tube that is not irradiated by the radiation reflected from the reflector surface. In this manner, on the one hand, the linear bearing rail is prevented from shading the absorber tube with respect to concentrated solar radiation and, on the other hand, an excessive thermal input into the linear bearing rail is prevented. The support device may for example comprise a feedthrough recess through which the absorber tube extends. Thus, it is advantageously achieved that the support device can mount the linear bearing rail arranged on the upper side of the absorber tube. Of course, it is also possible that the is guided past the absorber tube on one side in order to mount the linear bearing rail.

In the parabolic trough collector module of the invention it may be provided that the recess for the support device is formed in the parabolic reflector, e.g., by arranging the recess in the reflector surface. Basically, it is also possible that the recess is formed by the reflector surface is divided in two, the recess being located between the two parts. The reflector surfaces are arranged on the support structure, the support structure extending continuously in the longitudinal direction of the parabolic trough collector module.

The invention further refers to a parabolic trough collector unit comprising a plurality of parabolic trough collector modules of the invention which are arranged in a row, the parabolic trough collector modules comprise a common continuous absorber tube.

Here, it may be provided that the support structure of two adjacent parabolic trough collector modules are connected to each other. Thereby, it can be achieved that a torque applied to the parabolic trough collector module e.g. by a drive is also transmitted to the adjacent parabolic trough collector module, so that both parabolic trough collector modules are pivoted together. The connection of the support structures may be made, for example, via the supporting struts. Of course, it is also possible that the support structures are connected to each other via the support elements.

It may be provided that two adjacent parabolic trough collector modules each comprise a common stand post. This may enable the two adjacent parabolic trough collector modules to be mounted on a common radial bearing. For this purpose, for example, the supporting struts of the adjacent parabolic trough collector modules, which face each other, can be connected to each other and to the radial bearing. Thereby, the constructional effort for the stand device is kept low.

The invention further relates to a solar thermal power plant comprising a plurality of parabolic trough collector units of the invention which are arranged in a row, at least two adjacent parabolic trough collector units comprising a common continuous absorber tube string.

The design of the parabolic trough collector modules of the invention thus enables a plurality of parabolic trough collector modules to comprise a common continuous absorber tube, so that thermal and pressure losses caused by absorber tube connections necessary in prior art are avoided. Furthermore, such a design can be realized at low cost.

BRIEF DESCRIPTION OF THE FIGURES

The invention will be explained hereunder with reference to the following Figures.

In the Figures.

DETAILED DESCRIPTION

Figure 1:
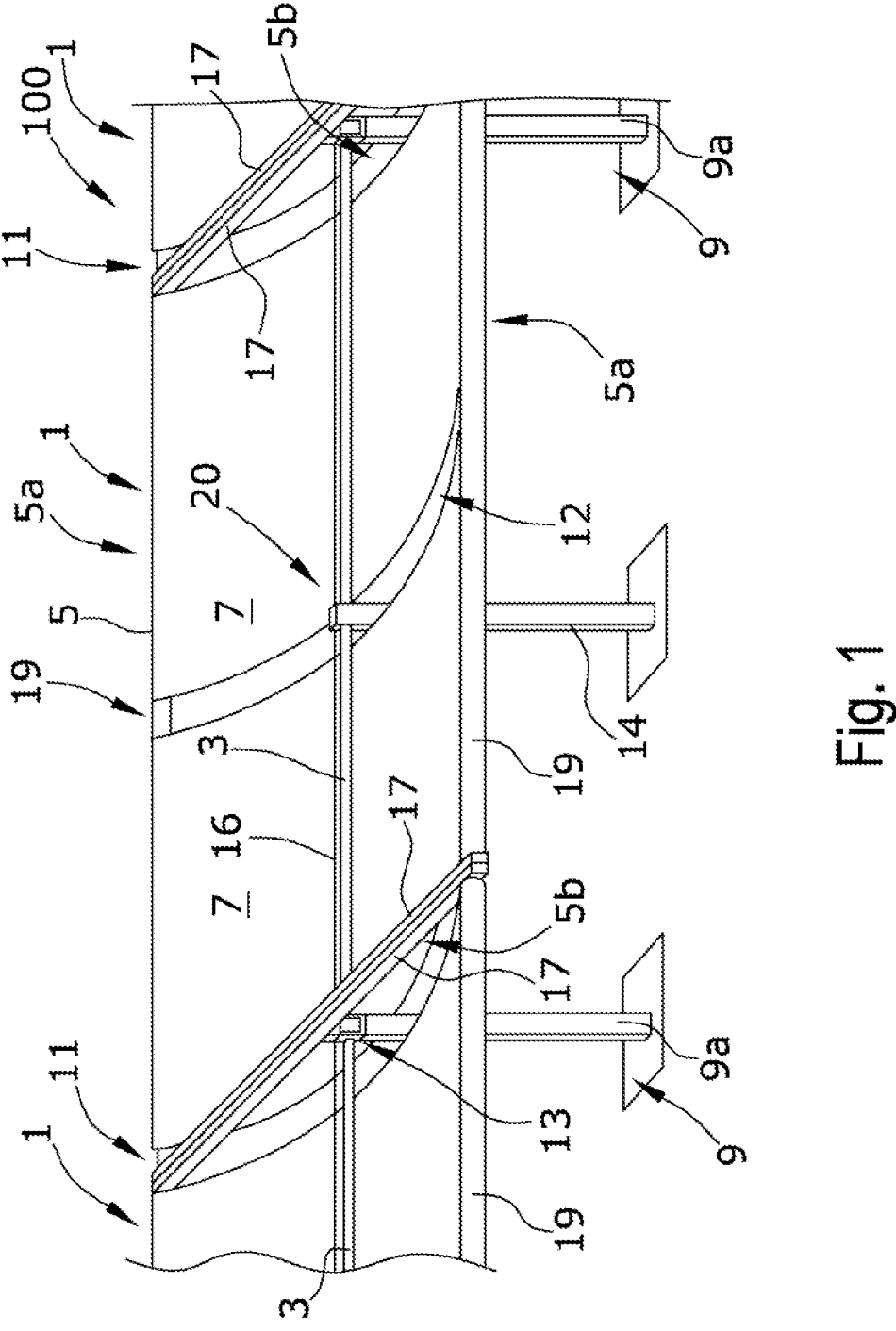
FIG. 1 is a schematic perspective view of a row of parabolic trough collector modules of the invention.

FIG. 1 schematically shows a perspective view of a parabolic trough collector module 1 of the invention. As indicated in FIG. 1, a plurality of the parabolic trough collector modules 1 of the invention can be arranged in a row. A plurality of the parabolic trough collector modules 1, for example fourteen, form a parabolic trough collector unit 100. A plurality of parabolic trough collector units 100 made up from parabolic trough collector modules 1 of the invention can be arranged in a row. For example, six parabolic trough collector units 100 of the invention arranged in a row form a so-called parabolic trough collector of a solar thermal power plant of the invention. A solar thermal power plant of the invention may be formed by a plurality of parabolic trough collectors assembled in this manner.

The parabolic trough collectors are typically oriented in a north-south direction.

Each parabolic trough collector module 1 of the invention comprises an absorber tube 3. Using a parabolic reflector 5 having a reflector surface 7, solar radiation can be reflected onto the absorber tube 3. The parabolic trough collector module 1 comprises stand devices 9 having stand posts 9a on which the parabolic reflector 5 is pivotally mounted. Two adjacent parabolic trough collector modules 1 respectively share one stand post 9a.

The absorber tube 3 extend continuously across a plurality of parabolic trough collector modules 1.

The absorber tube 3 is mounted on the stand device 9 via a linear bearing 13 forming a linear guide. The linear bearing 13 is illustrated in detail in FIG. 3a.

The parabolic reflector 5 has a recess 12 in the reflector surface 7, which extends transversely to the longitudinal direction. A support device 14 extends through the recess 12, which, similar to the stand posts 9a, is supported on the ground. At its upper end, the support device 14 has an absorber tube mount 20. The absorber tube mount 20 forms a linear guide for the absorber tube 3, so that the same is supported for displacement in the longitudinal direction. To form the linear guide on the absorber tube mount 20 and the linear bearing 13 on the stand posts 9a, a slide rail 16 extends above the absorber tube 3, on which the absorber tube 3 is guided, as shown best in FIGS. 3a and 3b.

The support device 14 supports at least a part of the weight of the absorber tube 3 on the ground, and thus an advantageous mounting of the absorber tube 3 is provided. By supporting the absorber tube using the support device 14, it is ensured that the absorber tube 3 is arranged as far as possible in the focal line of the parabolic reflector 5, and deviations caused, for example, by a deflection of the absorber tube 3 are avoided.

By providing the recess 12, it is ensured that the parabolic reflector 5 can still be pivoted regardless of the support device 14. Basically, it can be provided that the recess 12 is provided in the reflector surface 7 as a kind of elongated hole. In the embodiment illustrated in FIG. 1, the reflector surface 7 is completely interrupted so that two partial reflector surfaces are formed.

Figure 2:
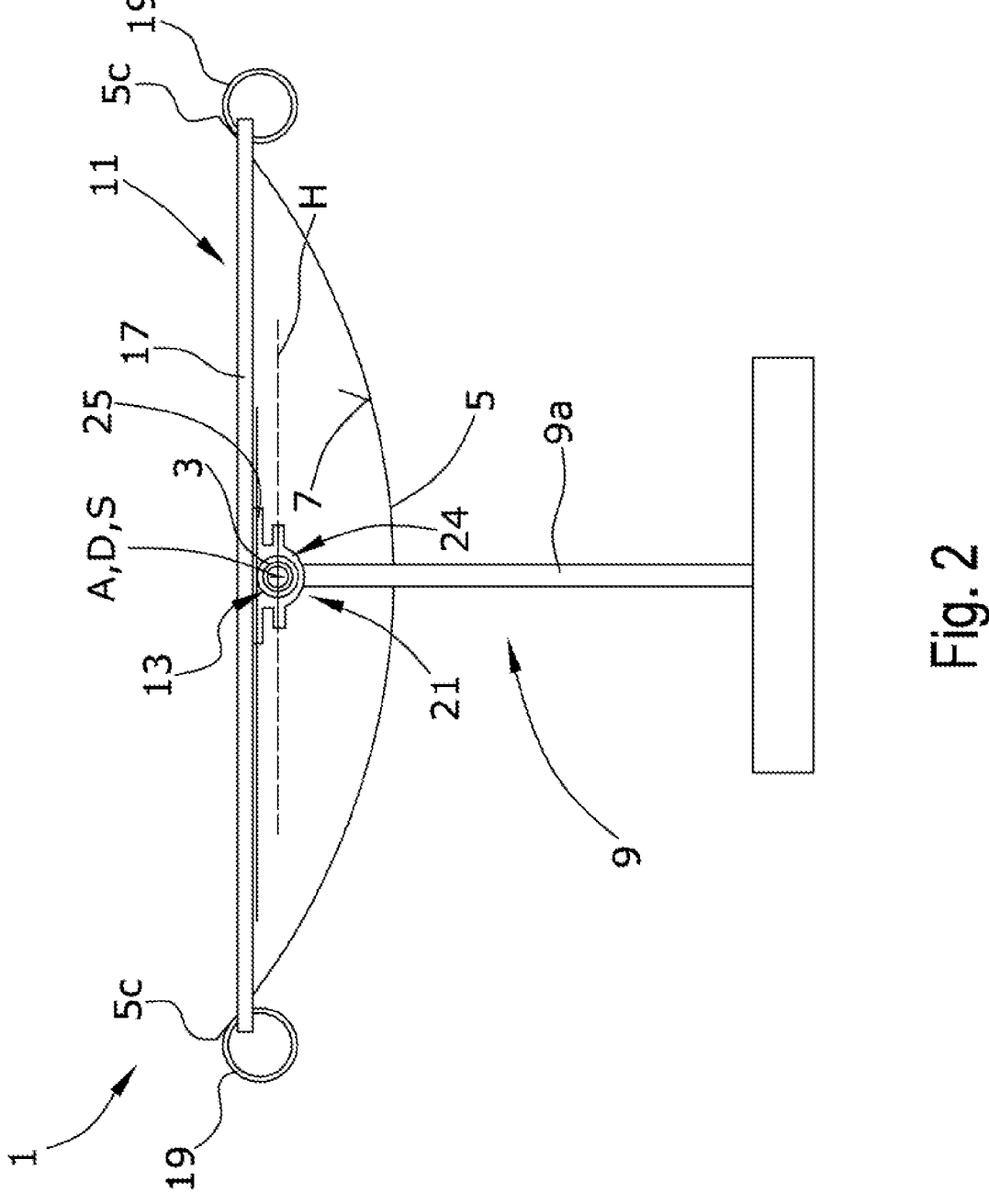
FIG. 2 is a schematic side view of the end face of a parabolic trough collector module of the invention.

The parabolic reflector 5 comprises a support structure 11, by means of which the parabolic reflector 5 is pivotally mounted on the stand device 9. As seen best in FIG. 2, which schematically illustrates one of the parabolic trough collector modules 1 shown in FIG. 1 in a view on the end face 5b, the parabolic reflector 5 is mounted on the stand device 9 via the support structure 11 by means of a radial bearing 21. Here, the radial bearing 21 comprises a radial bearing element 24 at each stand post 9a. The absorber tube 3 extends through the radial bearing element 24. In this manner, the absorber tube 3 can extend across adjacent parabolic trough collector modules 1.

The support structure 11 of a parabolic trough collector module 1 consists of two supporting struts 17 that are arranged at one of the end faces 5b, respectively. The support structure 11 further comprises two torsion-resistant support elements 19 arranged parallel to the longitudinal sides 5a. In the embodiment illustrated in the Figures, the torsion-resistant support elements 19 are arranged at the longitudinal edges 5c of the parabolic reflector 5.

The supporting struts 17 are connected to the torsion-resistant support elements 19. In this manner, a frame is formed into which the parabolic reflector 5 is inserted. The supporting strut 17 extends approximately along a chord to the parabolic shape of the parabolic reflector 5.

The supporting strut 17 is connected to a bearing housing 25 of the radial bearing 24, whereby the support structure 11 is supported at the stand posts 9a.

The radial bearing 21 is arranged such that the axis of rotation D of the parabolic reflectors 5 corresponds to the central axis A of the absorber pipe 3. In this manner, it is ensured that the parabolic reflector can be pivoted about the absorber tube which remains static.

The supporting strut 17 extends above the radial bearing 21. Thus, the supporting strut 17 and parts of the support elements 19 are located above the horizontal plane H extending through the central axis of the absorber tube, in which also the axis of rotation D lies. By an appropriate choice of the material of the support structure 11, it is thus possible to create a "counter weight" to the part of the reflector 5 arranged below the horizontal plane H so that the axis of gravity S of the parabolic reflector 5 and the support structure 11 can be placed on the axis of rotation D. In this manner, it is avoided that an imbalance occurs when the parabolic reflector 5 is pivoted during operation, which would cause the parabolic reflector 5 to tip over.

The torsion-resistant support elements 19 can be designed, for example, as so-called torsion tubes. For example, they can be designed as torsion- and bending-resistant sandwich tubes of a steel tube-GRP-steel tube connection.

With the support elements 19, it is achieved that even if the reflector surface 7 is completely interrupted by the recess 12, a stable structure of the parabolic reflector 5 is given and torques can be transmitted.

Figures 3A, 3B:
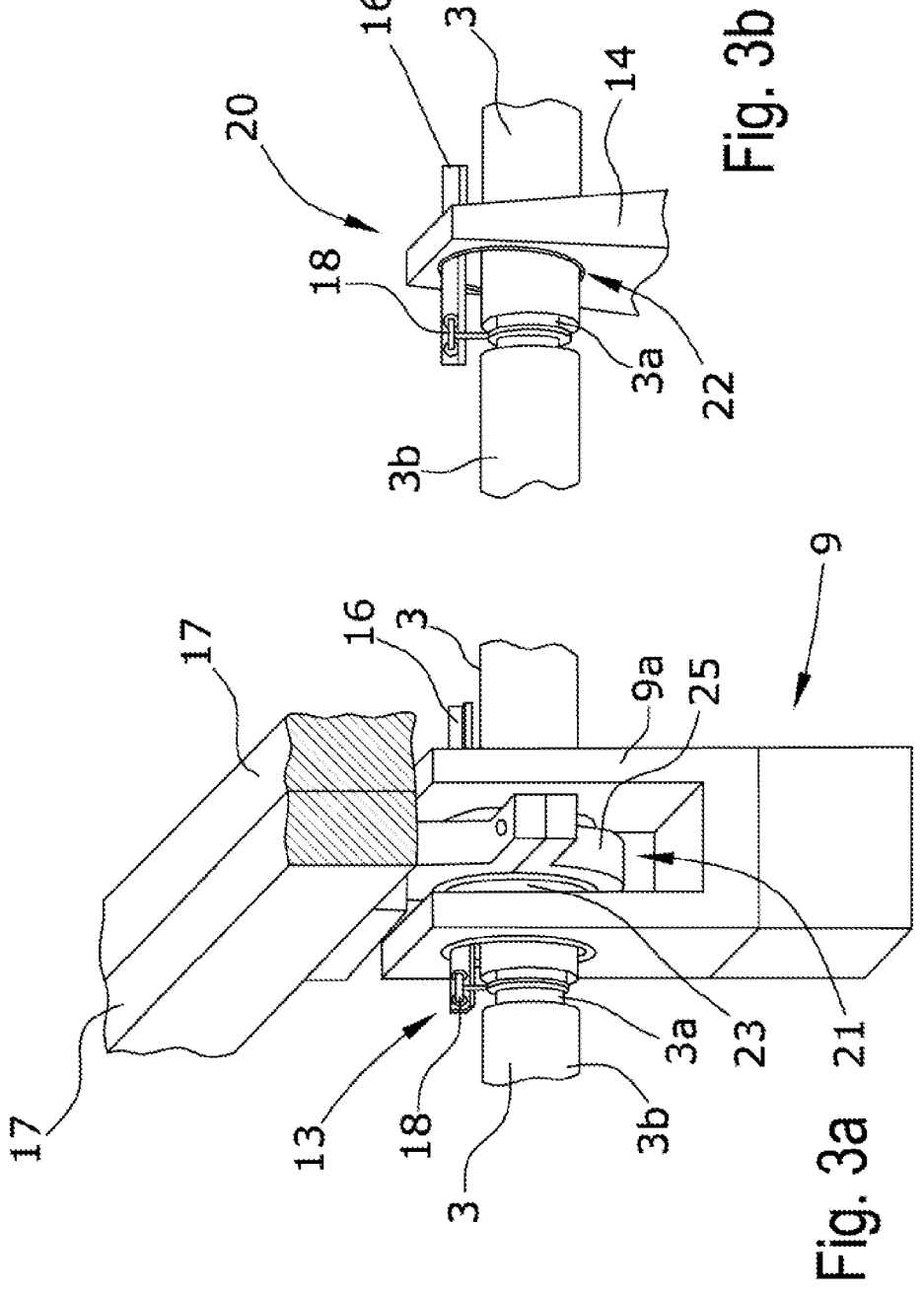
FIG. 3a is a view of a detail of the linear bearing of the absorber tube and of the radial bearing of the parabolic reflectors of FIG. 1.
FIG. 3b is a view of a detail of the absorber tube mount of the parabolic trough collector module of the invention of FIG. 1.

As can be seen in FIGS. 3a and 3b, the linear bearing 13 consists of a linear bearing rail 16 arranged above the absorber tube 3 and parallel to the absorber tube 3. A running gear 18 is guided on the linear bearing rail 16, which has rollers to roll on the linear bearing rail 16. The absorber tube 3 is connected to the running gear 18 and is suspended in the linear bearing rail 16 by means of the running gear 18, so that the absorber tube 3 hangs below the linear bearing rail 16.

The radial bearing 21 is supported on a through-pipe 23 fastened to the stand post 9a. The through pipe 23 extends in the axial direction of the absorber tube 3. The absorber tube 3 is guided through the through pipe 23. Further, the linear bearing rail 16 of the linear bearing 13 is fastened in the through tube 23. By means of such a construction, a fastening of the linear bearing 13 to the stand post 9a is provided in a simple manner, while, at the same time, a pivotal mounting of the parabolic reflector 5 about an axis of rotation can be provided which coincides with the central axis of the absorber tube 3.

The absorber tube mount 20 is illustrated in detail in FIG. 3b. The absorber tube mount 20 is formed at the upper end of the support device 14 and supports the linear bearing rail 16 extending in the axial direction of the absorber tube 3. The linear bearing rail 16 is used to linearly guide a running gear 18 that is connected to the absorber tube 3. The running gear 18 is guided on the linear bearing rail 16 in the same manner as the linear bearing 13.

The absorber tube mount 20 can be used to support the absorber tube 3 independently of the parabolic reflector 5.

The absorber tubes 3 are formed by an inner tube 3a and a cladding tube 3b which is transparent to solar radiation. In operation, a heat transfer medium is passed through the inner tube 3a.

The running gears 18 are connected to the inner tube 3a. Therefore, the cladding tube 3b is interrupted at this point. In order to be able to evacuate the gap formed between the cladding tube 3b and the inner tube 3a, the parts of the cladding tube 3b are sealed at the point of interruption.

The linear bearing 13 and the absorber tube mount 20 allow for a linear movement of the absorber tube 3 in the axial direction. Thus, thermal expansion of the absorber tube 3 can occur, without causing distortion or deflection the absorber tube 3.

The support device 14 has a feed-through recess 22 through which the absorber tube 3 extends. The linear bearing rail 16 is arranged on the upper side of the absorber tube 3 and thus on the side to which no or only a small portion of the solar radiation reflected by the parabolic reflector 5 is reflected. By providing the feed-through recess 22, it is achieved that the support device 14 can mount the linear bearing rail 16 in an advantageous manner.

Preferably, the feed-through recess 22 is formed in the region of the absorber tube mount 20 of the supporting device 14.

The design of the parabolic trough collector modules 1 of the present invention advantageously allows for a fixed-focus structure. Thereby, parabolic trough collector units of a plurality of parabolic trough collector modules can be provided in an advantageous manner, which have a common and continuous absorber string of absorber tubes 3. Thus, it is possible to provide a solar thermal power plant that can be provided at low investment costs, while at the same time a higher efficiency can be realized due to reduced pressure and heat losses in the absorber tube region.

The invention claimed is:

1. A parabolic trough collector module, comprising:
   an absorber tube having a central axis, a parabolic reflector which focuses solar radiation onto the absorber tube and which comprises a reflector surface, and a stand device, on which the parabolic reflector is pivotally mounted, the stand device having at least one stand post and the absorber tube being mounted on the stand post,
   wherein in the reflector surface the parabolic reflector has a recess running transversely to the longitudinal direction, a support device extending through the recess and having an absorber tube mount that forms a linear guide, on which mount the absorber tube is mounted for displacement in a longitudinal direction,
   wherein a support structure comprising two supporting struts arranged transversely to the central axis of the absorber tube and via which the parabolic reflector is mounted on the stand device, wherein the supporting struts are respectively arranged on an end face of the parabolic reflector,
   wherein the support device supports a part of the weight of the absorber tube independently of the parabolic reflector and the stand device.

2. The parabolic trough collector module according to claim 1, wherein a linear bearing forming a linear guide is arranged on the at least one stand post, via which bearing the absorber tube is mounted for displacement in a longitudinal direction.

3. The parabolic trough collector module according to claim 1, wherein the support structure comprises two torsion-resistant support elements extending parallel to longitudinal sides of the parabolic reflector.

4. The parabolic trough collector module according to claim 3, wherein the support elements are connected with the supporting struts.

5. The parabolic trough collector module according to claim 1, wherein the absorber tube mount comprises a linear bearing rail extending in the axial direction of the absorber tube.

6. The parabolic trough collector module according to claim 5, wherein the linear bearing rail is arranged on the upper side of the absorber tube.

7. The parabolic trough collector module according to claim 6, wherein the support device comprises a feed-through recess through which the absorber tube extends.

8. A parabolic trough collector unit comprising a plurality of parabolic trough collector modules according to claim 1, which are arranged in a row, wherein the parabolic trough collector modules comprise a common continuous absorber tube.

9. The parabolic trough collector unit according to claim 8, wherein a common stand device is arranged respectively between two adjacent parabolic trough collector modules.

10. A solar thermal power plant comprising a plurality of parabolic trough collector units according to claim 8, which are arranged in a row, wherein at least two adjacent parabolic trough collector units comprise a common continuous absorber tube string.

\* \* \* \* \*